June 4, 1935. V. EY 2,003,828
PRESSURE REGULATING AND FILTERING DEVICE FOR FLUIDS
Filed Oct. 17, 1934
Fig. 1.
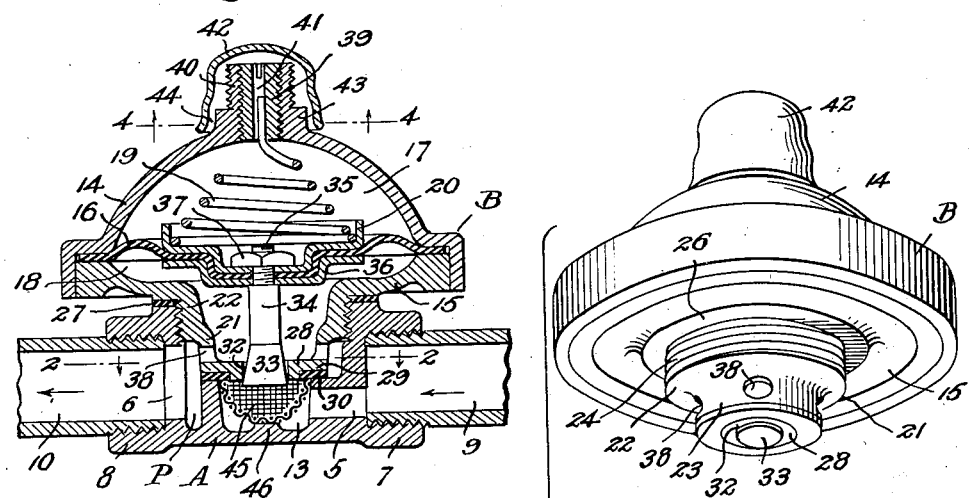
Fig. 3.
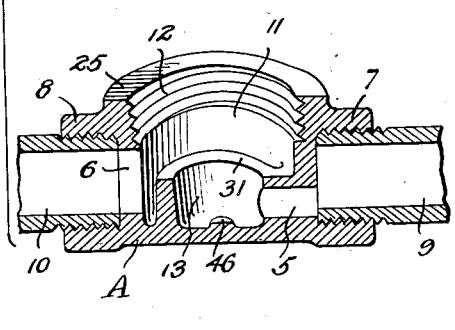
Fig. 2.
Fig. 4.
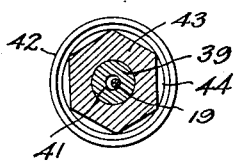
INVENTOR.
Victor Ey
BY Clark & Ott
ATTORNEYS.

Patented June 4, 1935

2,003,828

UNITED STATES PATENT OFFICE 2,003,828

PRESSURE REGULATING AND FILTERING DEVICE FOR FLUIDS

Victor Ey, New York, N. Y.

Application October 17, 1934, Serial No. 748,602

4 Claims. (Cl. 50—23)

This invention relates to devices which are interposed in a fluid line to act upon the fluid passing therethrough, and refers more particularly to certain improvements in a combined fluid pressure regulator and filter.

While it is appreciated that devices for the same general purpose have previously been devised, they have been open to certain objections and possess certain disadvantages, notably the difficulty of removing the pressure regulator as a unit from the pipe line and replacing the same without disrupting the line in order that the working parts of the same may be conveniently and readily inspected, adjusted or repaired.

It is, therefore, an outstanding object of the present invention to provide a device of the indicated character which is so constructed and arranged as to permit of the complete removal of the pressure regulator as an assembled unit from the fluid line without disrupting the line, while permitting, when the regulator is removed, the displacement of the filter screen and the cleansing and replacement or renewal of the same.

The invention aims as a further object to provide a combined pressure regulating and filtering device, the construction of which is such as to admit of the use of a maximum length of valve and valve stem in a device of overall minimum height, thereby minimizing the possibility of canting of the valve with reference to its seat, and insuring a proper seating of the valve.

As a further feature, the invention embodies a venting arrangement for the regulator casing which disposes the vent opening downwardly and thereby shields the same against clogging.

Other objects of the invention are to provide a device of the character set forth which embodies but few and simple parts, capable of economical production and assembly and which is highly efficient for its intended purpose.

With the above enumerated and other objects in view, reference is now made to the following specification and accompanying drawing in which there has been set forth by way of example, a preferred embodiment, while the claims cover variations and modifications thereof which fall within the scope of the invention.

In the drawing:

Fig. 1 is a vertical sectional view through a pressure regulating and filtering device constructed in accordance with the invention illustrating the same in applied position in a fluid line.

Fig. 2 is a horizontal sectional view therethrough taken approximately on the line 2—2 of Fig. 1.

Fig. 3 is a collective view of the device with the regulating unit in detached relation to the base and with the filtering element removed.

Fig. 4 is a detail horizontal sectional view taken approximately on the line 4—4 of Fig. 1, illustrating the improved vent arrangement.

Referring to the drawing by characters of reference, A designates generally the base member of the improved regulating and filtering device, and B indicates generally the regulator unit. The base member A includes inlet and outlet ports 5 and 6 communicating respectively with the threaded bosses 7 and 8 which have screwed thereinto the pipe sections 9 and 10 of a fluid pipe line to connect the sections of said line and form a continuation thereof, it being understood that the fluid in the pipe line flows in the direction indicated by the arrows. The base A is formed with a recess 11 which opens through one of its sides, preferably the upper side and which recess is interiorly threaded as at 12 at its upper end, and the outlet port 6 communicates with the recess 11. The base A is further provided with a filter well 13 which communicates respectively with the recess 11 and the inlet port 5 and which well is of a lesser diameter or cross sectional area than the recess 11 and preferably disposed concentric to the recess.

The pressure regulator unit B is in the form of a hollow casing including upper and lower sections 14 and 15 which are secured together in any desired manner and which clamp therebetween a flexible partition or diaphragm 16 which subdivides the pressure regulator casing into upper and lower compartments 17 and 18, the former housing a regulator valve spring 19 and a spring seat or cup 20. The lower casing section 15 is fashioned to provide a depending hollow boss 21, the upper portion 22 of which is of greater diameter than the lower portion 23 and said upper portion is externally threaded as at 24 to threadedly engage with the threads 12 of the recess 11 whereby the unit B is detachably associated with the base A.

The upper surface 25 of the base surrounding the recess cooperates with a downwardly facing seat 26 of the casing section 15 to clamp therebetween a gasket 27 whereby, when the unit and base are assembled, the recess 11 of the base is sealed and rendered fluid tight, the lower reduced portion 23 of the boss 21 has a lower end wall 28 which is provided with a marginal rabbet 29 in which there is arranged a gasket 30 which seats against the surface or shoulder 31 surrounding the upper end of the filter well 13 so as to seal the same. The wall 28 is formed with a central aperture 32 which constitutes a valve seat with which an upwardly tapering valve head 33 is adapted to seat, the valve head being provided with an upstanding stem 34 having a reduced threaded terminal 35 extending through a washer 36, through a central aperture in the diaphragm 16 and an aperture in the valve seat or cup 20. A nut 37 is threaded on the upper end of the terminal 35 thereby clamping the washer and valve seat or cup 20 at opposite sides of the diaphragm 16 and sealing the diaphragm at this point to prevent the escape of fluid from the lower compartment 18 of the unit casing B to the upper compartment 17. Due to the reduced size of the lower portion 23 of the boss 21, an annular passage P is formed between the outer periphery of the lower portion of the boss and the annular wall of the recess 11. Circumferentially spaced ports 38 are provided in the reduced lower portion 23 to establish communication between the lower compartment 18 and the annular passage P.

The upper end of the regulator spring seats within an adjusting screw 39 which is threaded through the neck 40 formed at the upper end of the casing section 14, whereby the tension of the spring may be adjusted to regulate the pressure at which the valve 30 will close. The screw 39 is provided with a longitudinal vent passage 41 to vent the upper compartment 17 of the regulator unit casing to the atmosphere. In order to shield the vent passage 41 against clogging, an inverted cup-shaped cap or dome 42 is employed which frictionally fits over the corners of the non-circular or angulated lower portion 43 of the neck 40, thereby providing downwardly disposed vent passages 44.

A semispherical filter element 45 is removably arranged in the filter well 13 and is supported on an upstanding stud 46 with its upper end impinged against the gasket 30, so as to surround the aperture 32 and intercept the fluid flowing from the inlet port 5 through the filter well and aperture 32. It will thus be observed, under the construction and arrangement described, that the boss 21 of the regulator unit combined with the base A provides high and low pressure chambers which are defined in part by the boss 21 and the base A. It will be apparent that the regulator unit, together with the valve and valve actuating mechanism, may be completely removed as an assembled unit from the base A, thereby facilitating the inspection, adjustment or repair thereof without necessitating any disruption of the fluid pipe line. It will also be apparent that when the unit B is thus removed, the filter element 45 is exposed and may be readily displaced, cleansed and replaced or renewed, while the filter chamber may also be cleansed to free the same of any sediment or foreign matter intercepted by the filter element and collected therein. It will be furthermore understood that when the governor unit B is removed, the interiorly threaded recess 12 may have a plug temporarily screwed thereinto so as to close the base member A and permit the line to function temporarily with ungoverned pressure until the governor unit is replaced.

What is claimed is:

1. A fluid pressure regulating and filtering device including a base member adapted to join the sections of a fluid pipe line to form a continuation of said line, said base section having inlet and outlet ports and a recess opening through one side thereof and communicating with the outlet port, and a filter well communicating respectively with the recess and the inlet port; a pressure regulator unit detachably associated with the base member and including a casing adapted to close and seal the recess, said casing having a valve controlled apertured wall covering the filter well and a filter element adapted to be introduced into the well through the recess and adapted to surround the aperture of the wall and retained in place therein by said wall.

2. A combined pressure regulating and filtering device including a base having inlet and outlet ports adapted to connect and communicate with the sections of a pipe line to constitute a continuation thereof, said base having a recess opening through the top of and communicating with the outlet port of the base and having a well communicating respectively with the recess and the inlet port; a pressure regulator unit including a casing having a hollow boss fitting into the recess in the base, said boss having a reduced lower portion spaced from the wall of the recess to define an annular chamber communicating with the outlet port and having a valve controlled bottom wall covering and sealing the well and providing high and low pressure chambers defined in part by the pressure regulator unit casing and the base and having passages in the side wall of the reduced lower portion establishing communication between the well and the annular chamber through the valve controlled bottom wall of the boss.

3. A combined pressure regulating and filtering device including a base having inlet and outlet ports adapted to connect and communicate with the sections of a pipe line to constitute a continuation thereof, said base having a recess opening through the top of and communicating with the outlet port of the base and having a well communicating respectively with the recess and the inlet port; a pressure regulator unit including a casing having a hollow boss fitting into the recess in the base, said boss having a reduced lower portion spaced from the wall of the recess to define an annular chamber communicating with the outlet port and having a bottom wall covering and sealing the well and providing high and low pressure chambers defined in part by the pressure regulator unit casing and the base, said bottom wall having an aperture defining a valve seat and a valve within the casing cooperating with the seat to regulate the pressure admitted to the low pressure chamber from the high pressure chamber and a filter element adapted to be introduced into the well through the recess and adapted to surround the aperture of the wall and retained in place therein by said wall and said boss having passages in the side wall thereof for establishing communication between the well and the annular chamber through the valve controlled aperture in the bottom wall of the boss.

4. A fluid pressure regulating and filtering device including a base member adapted to join the sections of a fluid pipe line to form a continuation of said line, said base member having inlet and outlet ports and a recess opening through one side thereof and communicating with the outlet port, and said base having a filter well communicating respectively with the recess and the inlet port; a pressure regulator unit detachably associated with the base and including a casing having a shoulder adapted to clamp a gasket against the base around the recess to close and seal the same and a depending boss having a valve controlled apertured bottom wall adapted to clamp a gasket against the upper surface of the wall forming the filter well to seal the same and a filter element, insertable and removable through the recess in the well covering the valve controlled aperture and retained in place by the bottom wall of the boss.

VICTOR EY.